(12) United States Patent
Koller et al.

(10) Patent No.: US 11,856,314 B2
(45) Date of Patent: Dec. 26, 2023

(54) METHOD FOR CORRECTING STITCHING PROBLEMS, REARVIEW SYSTEM AND VEHICLE

(71) Applicant: Motherson Innovations Company Limited, London (GB)

(72) Inventors: Matthias Koller, Stuttgart (DE); Romeo Wieczorek, Stuttgart (DE)

(73) Assignee: Motherson Innovations Company Limited, London (GB)

(*) Notice: Subject to any disclaimer, the term of this patent is extended or adjusted under 35 U.S.C. 154(b) by 9 days.

(21) Appl. No.: 17/708,809

(22) Filed: Mar. 30, 2022

(65) Prior Publication Data
US 2023/0319222 A1 Oct. 5, 2023

(51) Int. Cl.
| | |
|---|---|
| *H04N 5/265* | (2006.01) |
| *G06V 20/56* | (2022.01) |
| *G06F 3/0482* | (2013.01) |
| *B60R 1/28* | (2022.01) |
| *H04N 23/62* | (2023.01) |
| *H04N 23/90* | (2023.01) |
| *H04N 23/63* | (2023.01) |
| *H04N 23/695* | (2023.01) |

(52) U.S. Cl.
CPC ............ *H04N 5/265* (2013.01); *B60R 1/28* (2022.01); *G06F 3/0482* (2013.01); *G06V 20/56* (2022.01); *H04N 23/62* (2023.01); *H04N 23/632* (2023.01); *H04N 23/695* (2023.01); *H04N 23/90* (2023.01); *B60R 2300/101* (2013.01); *B60R 2300/105* (2013.01); *B60R 2300/20* (2013.01); *B60R 2300/303* (2013.01)

(58) Field of Classification Search
CPC .......... B60R 1/06; B60R 1/1207; B60R 1/00; B60R 2001/1215; B60R 11/04; B60R 1/04; B60R 1/087; B60R 1/12; B60R 11/0229; B60R 16/0239; H04N 23/698; H04N 7/185; H04N 23/50; H04N 23/51; H04N 23/661; H04N 23/68; H04N 23/6812; H04N 23/683; H04N 23/695; H04N 23/90
USPC ....................................................... 348/148
See application file for complete search history.

(56) References Cited

U.S. PATENT DOCUMENTS

| | | | |
|---|---|---|---|
| 2015/0378143 A1* | 12/2015 | Auguste ............... | G02B 21/367 359/363 |
| 2019/0260970 A1* | 8/2019 | Lu ......................... | H04N 7/181 |
| 2021/0092331 A1* | 3/2021 | Terauchi ................ | B60R 1/074 |

* cited by examiner

*Primary Examiner* — Masum Billah
(74) *Attorney, Agent, or Firm* — Jones Day

(57) ABSTRACT

The disclosure refers to a method for correcting stitching problems in a rearview system, said rearview system comprising at least two cameras mounted on at least one external camera wing of a vehicle, with the at least one camera wing being configured to be moved between an operating position, in which each camera has a rearview for capturing an image, and at least one folding position, and at least one display configured for displaying at least one of the images captured by each of the at least two cameras as a composite image and a menu for correcting stitching problems, the method comprising the steps of determining a change from the at least one folding position to the operating position of the at least one camera wing; opening the menu for correcting stitching problems; and closing the menu either after correction or after receiving a signal to skip correction.

12 Claims, 4 Drawing Sheets

METHOD FOR CORRECTING STITCHING PROBLEMS, REARVIEW SYSTEM AND VEHICLE

FIELD OF THE DISCLOSURE

The present disclosure relates to a method for correcting stitching problems in rearview systems with at least two cameras. Moreover, the present disclosure relates to a rearview system comprising a least two cameras and configured for executing said method and a vehicle, especially a truck, comprising such a rearview system.

Especially in trucks, but also in some passenger cars and other vehicles, nowadays camera based rearview systems are provided instead of external side mirrors. There may be one camera on the driver side and one camera on the passenger side of a vehicle. Often however, there are multiple cameras provided at least on one side of the vehicle. These multiple cameras take pictures from different views and/or are focused on different details. For example, there is one camera focused on far rear traffic, another one is focused on the edge of a roadway the vehicle moves on. Other possible cameras are equipped with a wide-angle lens giving a driver a better rearview especially in maneuver situations. For orientation purposes, it is important for the driver to see the outer contour of the vehicle. Therefore at least one of the multiple cameras is set to record an outer edge of the vehicle.

Usually, the cameras are connected to the vehicle individually or in groups of several cameras via one or more camera mounts, usually called camera pods or camera wings. In the following the term "camera wing" is used to cover all possible mounts.

The picture captured by each camera can be shown on a separate display. This can lead to a confusing number of displays with many cameras provided. Therefore, one image on one display is usually composed of the images or part of the images from different cameras. In case two images from two different cameras are shown on one display as a composite image, it is very important that details being part of more than one image from one camera have no visible interruptions or offsets in the plane spanned on the display, i.e. in x and y direction. For example, there should be no visible cutouts of curbs or the outside edge of the vehicle to which the cameras are mounted.

In many cases, these interruptions or offsets occur infrequently, and only after a camera wing carrying two or more cameras has been folded down or in once and been folded back again. Such folding may occur in case the camera wing collides with an obstacle or when the camera wing is deliberately folded in by the driver, for example, in order to pass through a bottleneck with the vehicle. During folding movement, tolerances or other effects can cause the camera position(s) to no longer be completely accurate, which can then lead to the problems mentioned above.

Here, the position of a camera wing is called operating position, when the cameras are positioned for obtaining a rearview, with said operating position representing a position within a predefined tolerance range to the accurate operating position.

The term "rearview" comprises a view of the rear and the side of a vehicle and even at least part of the front of the vehicle.

RELATED ART

U.S. Pat. No. 10,904,489 B2 discloses a method of calibrating cameras of a multi-camera vision system for a vehicle moving along a vehicle assembly line including equipping the vehicle as it moves along the vehicle assembly line with a plurality of cameras and equipping the vehicle with an image processor for processing image data captured by the cameras. As the vehicle moves along the vehicle assembly line, a driver-side target at a driver-side region of the vehicle assembly line is present within the fields of view of front, driver-side and rear cameras, and a passenger-side target at a passenger-side region of the vehicle assembly line is present within the fields of view of the front, passenger-side and rear cameras. The cameras are calibrated responsive to processing image data of the driver-side target captured by the front, rear and driver-side cameras and image data of the passenger-side target captured by the front, rear and passenger-side cameras. Therewith, a vehicle coming out of a vehicle assembly plant may be calibrated or adjusted to allow suitable stitching performance. However, when the vehicle is involved in some kind of accident or other circumstances and needs a repair, such as when one or more cameras of a multi camera system is replaced on the vehicle, due to the variation or tolerance of the new camera(s) installation in terms of camera angles, the original stitching may no longer provide proper performance. Besides the possibility of using the same automatic calibration target and process as described above, one can use a manual calibration process that involves the adjustment and judgment of a human. The calibration involves a human machine interface, such as a video display screen and/or one or more or several buttons or touch sensors or inputs or the like on the display touch panel, or if touch panel is not available, an external device that has buttons or inputs or sensors and connects to a vehicle communication bus, or existing vehicle switches, dials, buttons, steering wheel or pedals or any other suitable user input. The buttons or user inputs that the user can use during the manual calibration may include, but may not be limited to, the following:

Horizontal corner stretching and compression
Vertical corner stretching and compression
Horizontal stretching and compression
Vertical stretching and compression
Rotation-clockwise and counterclockwise
Horizontal shift
Vertical shift
Camera selection
Start and stop as optional.

U.S. 2020/0294268 A1 discloses a car lens offset detection method and a car lens offset detection system. A first image capturing device and a second image capturing device are disposed on a car, and the method includes: capturing a first image with use of a first image capturing device and capturing a second image with use of a second image capturing device; obtaining a plurality of first feature points from the first image according to a plurality of first predetermined positions and obtaining a plurality of second feature points from the second image according to a plurality of second predetermined positions; comparing feature values of the first feature points with feature values of the second feature points by a processor and determining whether the first feature points match the second feature points by the processor; in response to the first feature points not matching the second feature points, the processor performs a calibration and warning operation. In an embodiment, when the processor determines that the first feature points do not match the second feature points, the processor can perform the calibration and warning operation and control the display device to display a calibrated image, so that the driver can manually calibrate the lens direction of the car lens according to the indicative information provided by the calibrated image. More specifically, when the processor determines that the first feature points do not match the second feature points, the processor can control the display device originally displaying the stitched image to be switched to display the calibrated image which simultaneously includes two images respectively captured by the first image capturing device and the second image capturing device, and the two images are marked by a plurality of marked points, so as to allow the driver to adjust the lens direction according to the marked points in the calibrated image.

Thus, an automatic method for correcting of stitching problems using a processor is known. A manual method is also known but requires a technician in a service center environment. These known methods are costly and will not be performed after every movement of the camera wing, either because the driver forgets about it or because he/she prefers to accept the safety defect of the offset or the interruption of a displayed detail due to time pressure rather than to make the time-consuming correction or have it made.

It is the object of the present disclosure to provide a simple method for correcting stitching problems in rearview systems with at least two cameras, that can be performed by a driver without the need of special equipment or environment and without the need of special deep skills and that represents a low-threshold offer to the driver. It is another object of the present disclosure to provide a rearview system comprising a least two cameras and configured for executing said method. A further object of the present disclosure is to provide a vehicle, especially a truck, comprising the rearview system comprising at least two cameras and configured for executing the a method for correcting of stitching problems.

SUMMARY

A method for correcting stitching problems in a rearview system is provided. The rearview system may include at least two cameras mounted on at least one external camera wing of a vehicle, with the at least one camera wing being configured to be moved between an operating position, in which each camera has a rearview for capturing an image, and at least one folding position, and at least one display configured for displaying at least one of the images captured by each of the at least two cameras as a composite image and a menu for correcting stitching problems, the method comprising the steps of determining a change from the at least one folding position to the operating position of the at least one camera wing; opening the menu for correcting stitching problems; and losing the menu either after correction or after receiving a signal to skip correction.

An embodiment is comprising a manual correction step for manual correction between the opening menu step and the closing menu step. Further, the signal may be at least one of provided in response to a manual input and generating a warning signal.

In an embodiment at least during the manual correction step at least one of a human machine interface for manipulating at least one of the at least two captured images is provided and an orientation line is faded in the captured image or in each captured image to be manipulated for correction.

The human machine interface may be provided by the display or a separate device or a remote device. Further, the human machine interface may comprise at least one of at least one touch sensor, at least one gesture sensor, a microphone, a loud speaker, a display device and at least one vibration generator. Still further the human machine interface allows a selection of at least one of the following options: starting a correction procedure, skipping a correction procedure, finishing a correction procedure, performing a correction procedure, shifting each captured image to be manipulated along an x axis, shifting the faded in orientation line of each captured image to be manipulated along the x axis, shifting each captured image to be manipulated along an y axis, and shifting the faded in edge line of each captured image to be manipulated along the y axis. In addition, the human machine interface may provide at least one of at least one virtual button, at least one virtual bar, at least one directional beam, and a coordinate system with x and y axes.

In another embodiment, each faded in orientation line represents a side edge of the vehicle. The side edge of the vehicle may be at least one of determining a vehicle part fixed relative to a driver's cabin of the vehicle and determined automatically based on at least one of stored data and the pixel flow technology. Thus, the orientation line is an edge line.

In another embodiment, each faded in orientation line represents at least one of a side edge of the vehicle, a curb and a road line, and/or each faded in orientation line is at least one of determining a vehicle part fixed relative to a driver's cabin of the vehicle, and determined based on information of at least one of the vehicle contour, a curb and a road line.

In a further embodiment, each faded in orientation line is determined, automatically or on demand, based on at least one of stored data, the pixel flow technology and object detection. Object detection may be based on the images captured by cameras, in particular the first and second cameras. The side edge may be determined based on a determined curb or road line, for example using object detection.

In yet another embodiment the manual correction step comprises at least one of hitting a button displayed on a touch-sensitive display by hand and moving a control device by hand.

The present disclosure also provides a rearview system configured for execution of the method for correcting stitching problems, comprising at least two cameras mounted on at least one camera wing being configured to be moved between an operating position, in which each camera has a rearview for capturing an image, and at least one folding position, at least one display configured for displaying at least one of the images captured by the at least two cameras as a composite image, at least one position sensor for every camera wing configured for detecting whether or not the camera wing is in its operating position, a controller configured for controlling the recording direction of at least one of the at least two cameras, with the controller being operable by hand. The controller may operable via at least one of a touch, a gesture and a voice command.

Still further a vehicle, comprising the rearview system is provided.

In the operating position of a camera wing, the cameras mounted on said camera wing have a pre-defined recording direction, with usual location tolerances. In case, the camera wing has been folded and been folded back again, the position of the camera wing and/or the mounted cameras may be slightly different from the original calibrated operating position. The difference may be within the tolerance or may exceed the tolerance. Such folding may occur in case the camera wing collides with an obstacle or when the camera wing is deliberately folded by a driver.

As a folding movement may cause cameras to become misaligned, visible interruptions or offsets of displayed image details in the plane spanned on the display, i.e. along the x and y direction, may occur. The method of the present disclosure offers a simple method for correcting such problems. The method allows a driver without the need of special equipment or environment and without the need of special deep skills, to achieve an alignment resulting in a composite image on the basis of which safe maneuvering is possible. Since the method is offered to the driver automatically as soon the camera wing has been folded and returned to the operating position back again, the method represents a low-threshold offer to the driver. The driver can choose to execute the correction or cancel the process.

A menu facilitating the correction on behalf of the driver may be displayed next to the composite image display on a touch-sensitive display. The correction of the alignment is, thus, offered to the driver who can select between starting or canceling, i.e. skipping, a correction procedure by simply hitting a button on the touch-sensitive display. Such an offer makes it especially easy for the driver to react and thus represents a particularly low-threshold offer.

The alignment as such may be performed also simply by hitting a button displayed on the touch-sensitive display by hand. Again, such an offer increases handling of the method for the driver and thus decreases the threshold for executing the correction. Instead of hitting a button, a control device like a joystick may be moved, which allows the correction to be performed intuitively. Many alternative human machine interfaces suited for the correction process are known to the skilled person.

For further facilitating the procedure, orientation lines in form of edge lines are faded into the composite image, one per captured image. Said edge lines simply have to be arranged at the edge of the displayed vehicle, being for example the lower side edge of the vehicle. Such an edge line alignment may also be achieved by drag and drop movements at a finger touching the touch-sensitive display.

Thus, the present disclosure enables an easy manual correction of stitching problems in rearview systems with two or more cameras mounted on one or more vehicle side wings. I.e. a manual corrector of stitching problems in rearview systems with n+1 cameras is provided, n being a natural number.

BRIEF DESCRIPTION OF THE DRAWINGS

In the following, preferred embodiments of the present disclosure are explained in more detail with reference to schematic drawings, in which.

DETAILED DESCRIPTION

Figure 1A:
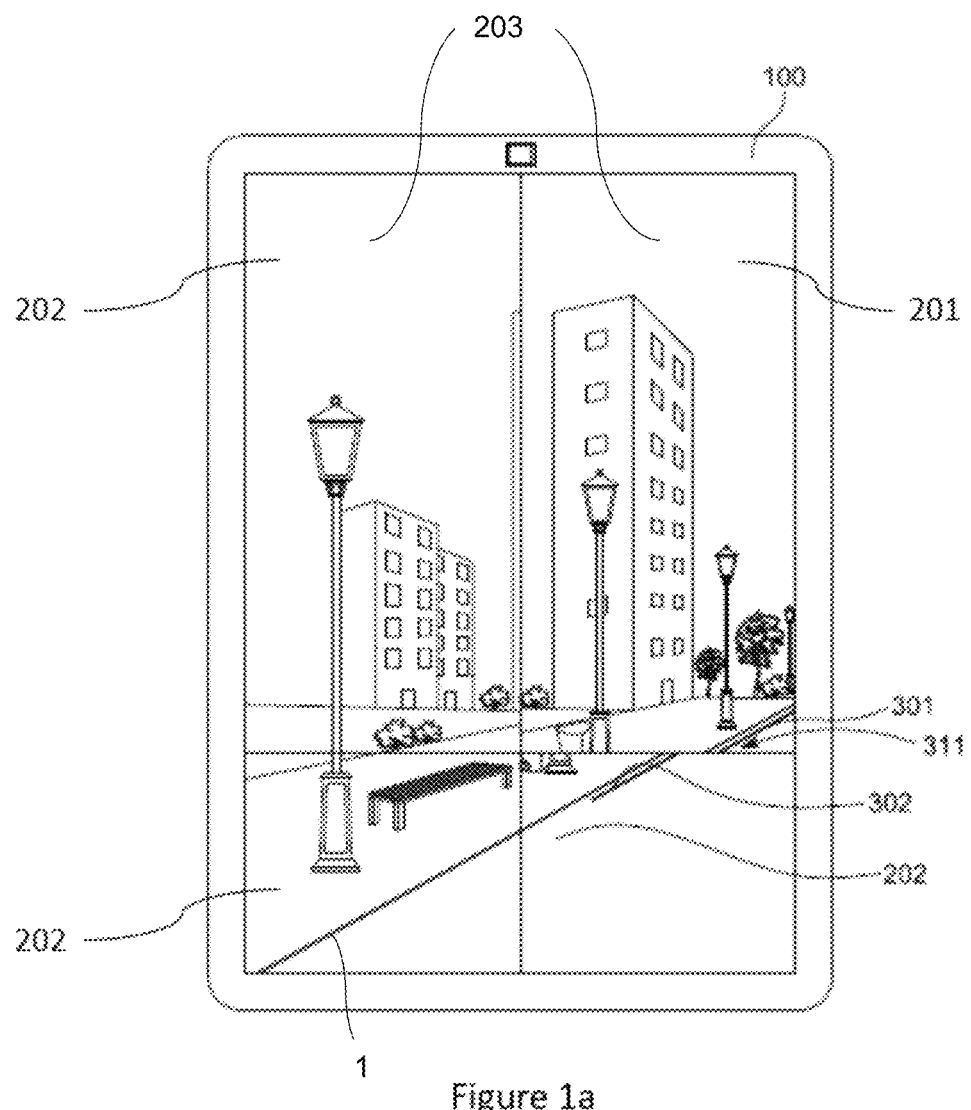
FIG. 1a shows a display with an image composed of at least two different camera images with an interruption in a faded in colored edge line.
Figure 1B:
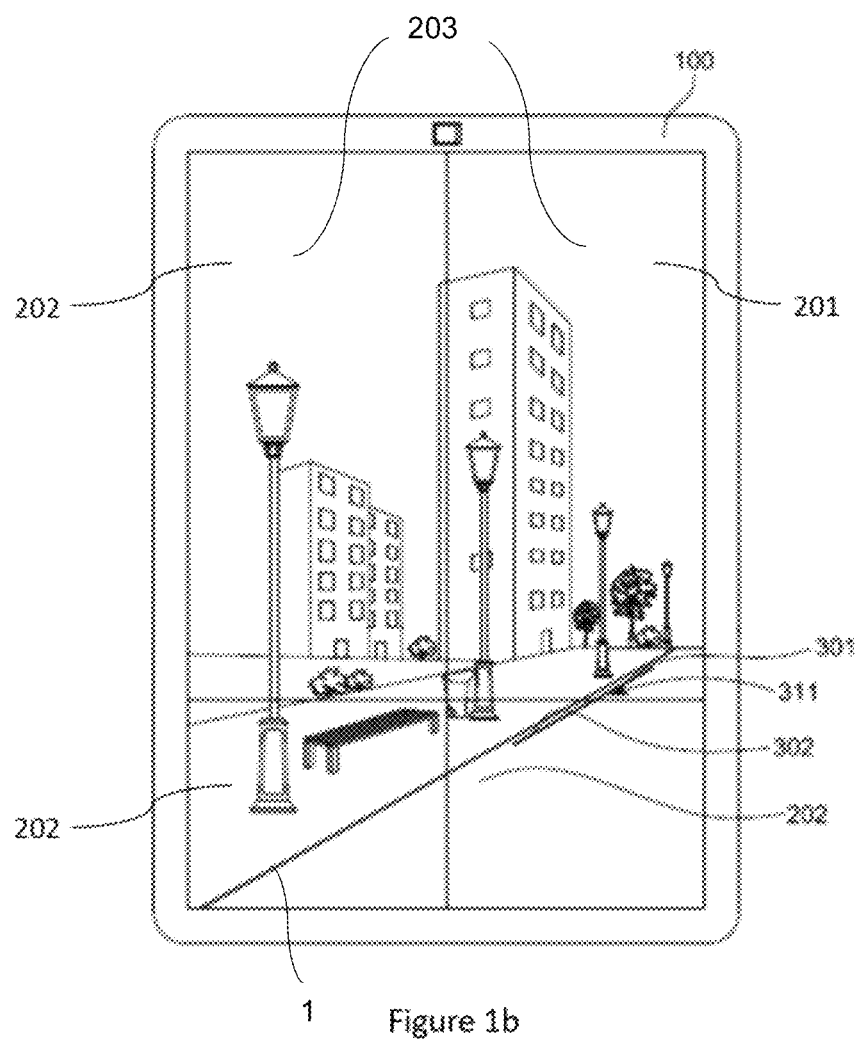
FIG. 1b shows the same display as in FIG. 1a, in which the interruption in the faded in colored edge line is corrected.

In FIG. 1a and FIG. 1b, a display 100 is shown. The display 100 is arranged in the driver's cabin of a vehicle, in particular in form of a truck. On the display 100 the images 201, 202 captured from two cameras mounted on a camera pod or an exterior camera wing (not shown) at the driver side of the truck.

The two images 201, 202 are shown in form of a composite camera image 203. A first image 201 captured by a first camera provides a rear view of an area in a greater distance behind the truck, while a second image 202 captured by a second camera shows a rear view of an area closer to the truck. The second camera may have a wide-angle lens, which results in that the image captured by the second camera 202 may show more details. In both, the first and the images orientation lines 301, 302 may be faded in, with each one of the two orientation lines 301, 302 follow a curb 1 as perceived by the respective camera. The orientation lines 301, 302 may be colored, for example both be orange or red, in order to be easily discernible. They may run parallel to the curb 1 with a small distance to the curb 1.

Each orientation line 301, 302 may be determined by object detection, here curb detection. But other techniques well known to a person skilled in the art may also be use. For example the determination can be based on stored data or the so-called pixel flow technique, which determines those pixels which are not moving relative to the respective camera during a truck ride.

In the composite camera image 203 shown in FIG. 1a, between the orientation lines 301, 302 an offset or interruption 310 can be seen, which is the result of a stitching problem. Such an interruption 310 may occur after the camera wing has folded down or in once and been folded back again into a viewing or operating position. Such folding may occur in case the camera wing collides with an obstacle or when the camera wing is deliberately folded by the driver, for example, in order to pass through a narrow pathway or bottleneck surrounding with the truck. During such a folding movement, tolerances or other effects can cause the camera positions to no longer be accurate, i.e. the cameras become misaligned. Such a misalignment may cause problems in maneuvering the truck, as e.g. the relative distance between the truck edge and a curb stone edge can no longer be determined correctly by the driver.

In the composite camera image 203 shown in FIG. 1b, the stitching problem is corrected, so that the orientation lines 301, 302 show a minimalized interruption 311 or even no interruption at all. When comparing FIGS. 1a and 1b, it can also be seen that the un-stitched composite image shows two trees between the houses, which merge into one tree after stitching.

A correction or better alignment method enabling the above described stitching may be automatized or achieved manually as described with reference to FIG. 2.

An automatic alignment may for example be achieved in that each image 201, 202 has an allocated coordinate point K with respect to a defined x axis and y axis at its lower left point, like K201=0/50 and K202=0/0. In case the tolerance region is selected to be +−20, a misalignment in x direction may result in K201 being shifted to 5/50 or −5/50, and a misalignment in y direction may result in K201 being shifted to 0/55 or 0/45 in y direction.

Figure 2:
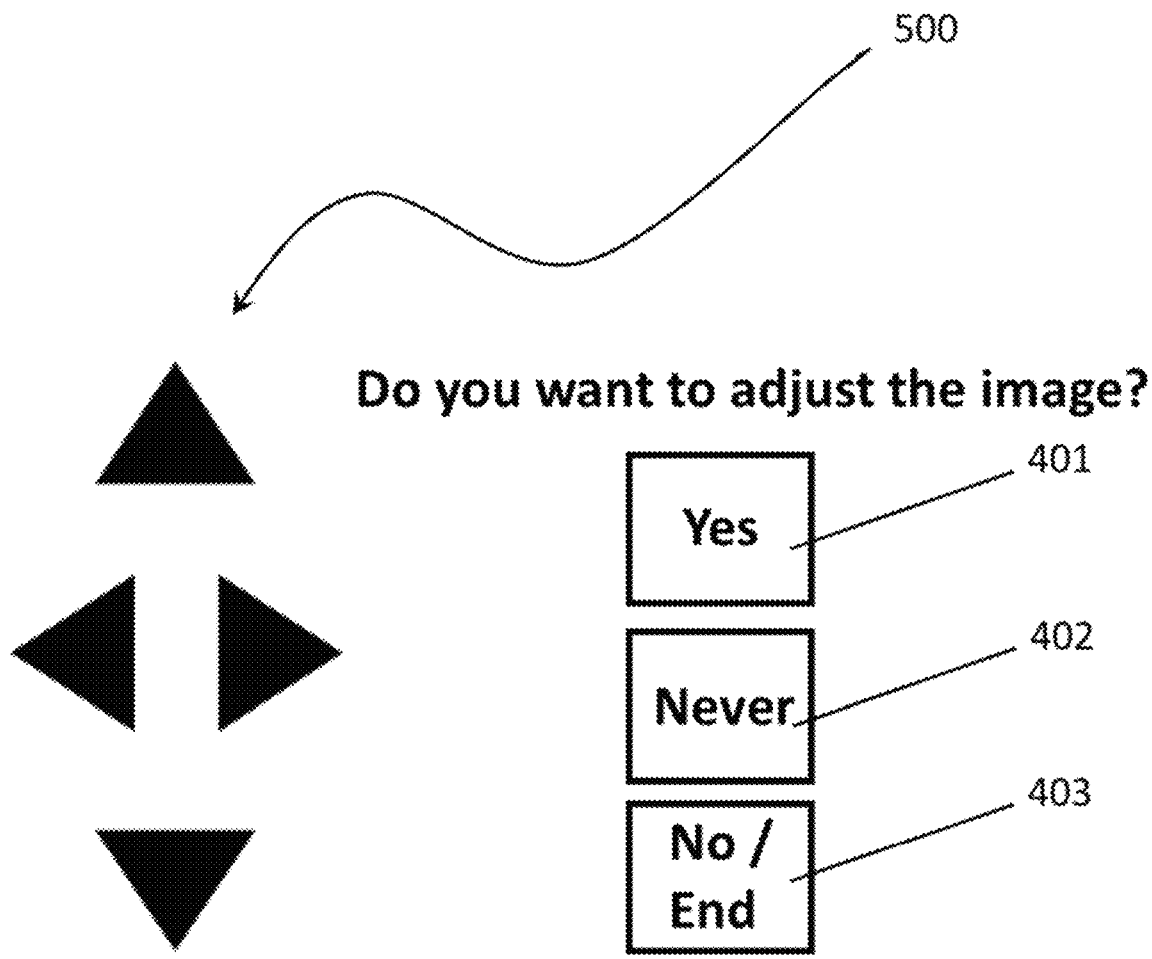
FIG. 2 shows an example of menu as it may be displayed on a display configured for displaying the image captured by at least one of the at least two cameras.

FIG. 2 shows an example of an alignment menu which may be displayed on the display 100, which is also configured for displaying the image captured by at least one of the at least two cameras. For example, the menu may be shown underneath the composite image 203; but it is also possible to present the menu on another display. At least when displaying the menu, the orientation lines 301, 302 are faded into the composite image 203.

Via the menu, a question "Do you want to adjust the image?" is posed and three answer buttons are displayed: a Yes-button 401, a Never-button 402 and a No/End-button 403. The display 100 may be designed as a touch-sensitive display. Therefore, the driver may answer the posed question by hitting one of the displayed buttons 401, 402, 403. In case the Yes-button 401 is hit, an arrow field 500 is activated. The arrow field 500 displays four arrows for allowing a shift along the x and/or the y axis. By hitting one of these four arrows, the driver may move a camera image in the direction in which the arrow points. By doing so the faded in orientation line 301 in the image 201 captured by the first camera may be aligned relative to the faded in orientation line 302 in the image 202 captured by the second camera until the interruption 310, 311 between the faded in orientation lines 301, 302 is minimalized. The driver may continue minimizing the interruption until a satisfactory view is obtained. After having completed the minimization, the driver may hit the No/End-button 403 and the menu is closed. In this case, the composite camera image is displayed on the display 100 without the menu, as shown in FIG. 1b.

However, the driver does not have to carry out the alignment method, but can also hide the offered menu from the outset via the No/End button or do without an alignment by hitting the Never-button 402. The menu, for example, may only be switched off until the next start of the truck.

Figure 3:
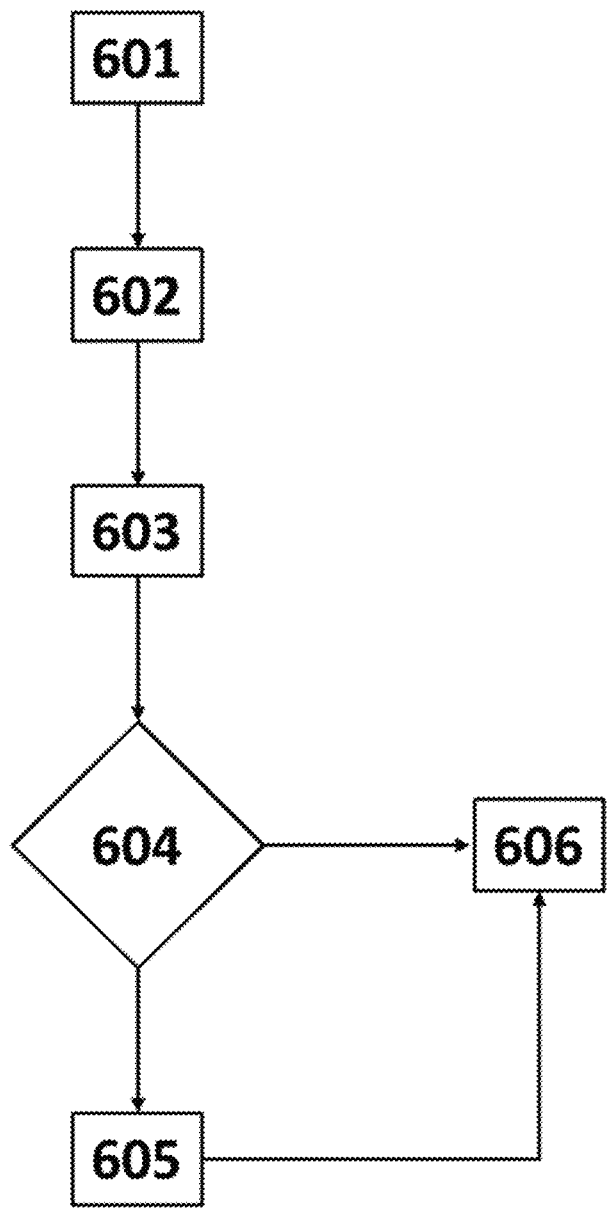
FIG. 3 shows a schematic flow diagram of the method according to the disclosure.

FIG. 3 shows a schematic flow diagram of the method according to the disclosure. The method starts with a first step 601 by detecting a folding, and a second step 602 is triggered by the detection that the camera wing is back in its operating position 602. Such detections may be realized via a micro switch, with the micro switch being contacted in case the camera wing is in its operating position and loses contact in case the camera wing leaves its operating position. This allows to detect that the camera wing has been folded in and folded back again, be it because the camera wing has collided with an obstacle or because the camera wing is deliberately folded by the driver. Thus, the first step 601 may be summarized by: "micro switch has lost contact"; and the second step 602 may be summarized by: "micro switch has got contact again".

After folding back again, the camera positions may no longer be aligned, possible leading to stitching problems. Therefore, in a third step 603 "opening of menu" the menu shown in FIG. 2 opens. In a fourth step 604 "question and decision", the question whether the driver wants to adjust the image, i.e. align the orientation lines 301, 302, is posed. In case the driver answers with yes, at a fifth step 605 "enabling correction" an alignment is enabled. After completing the alignment, the driver may close the menu and the composite camera image is displayed without the menu in a sixth step 606. In case the driver answers with no or never in the fourth step 604, the menu directly jumps to the sixth step 606, such that the composite camera image is displayed without the menu as well, but with the misalignment. menu is closed, display of composite camera image.

The orientation lines 301, 302 are faded into the composite image 2031 so during manual alignment tolerances may be given, restricting possible shifts of the orientation lines 301, 302 along the x and y axes.

In case a misalignment exceeds a threshold, a waring may be outputted e.g. on the display 100 or via another output. The output may be acoustic or via a vibration of the steering wheel or any other suited signal.

The features of the present disclosure of the foregoing description, the following drawings and claims may be essential for the realization of the present disclosure in its various embodiments, either individually or in any combination.

REFERENCE SIGN LIST 1 curb
100 display
201 first image captured by first camera
202 second image captured by second camera
203 composite image comprising first and second images
301 first edge line in first image
302 second edge line in second image
310 edge lines interruption
311 corrected edge lines interruption
401 Yes-button
402 Never-button
403 No/End-button
500 arrow field
601 first step
602 second step
603 third step
604 fourth step
605 fifth step
606 sixth step

The invention claimed is:

1. A method for correcting stitching problems in a rearview system, said rearview system comprising two cameras mounted on an external camera wing of a vehicle, with the external camera wing being configured to be moved between an operating position, in which each camera has a rearview for capturing an image, and a folding position, and a display configured for displaying at least one of the images captured by each of the two cameras as a composite image and a menu for correcting stitching problems, the method comprising:
　determining a change from the folding position to the operating position of the external camera wing;
　opening the menu for correcting stitching problems;
　manually correcting the stitching problems, wherein during manual correction,
　　a human machine interface for manipulating at least one of the captured images is provided, and
　　an orientation line is faded in the captured image or in each captured image to be manipulated for correction; and
　closing the menu after correction.

2. The method of claim 1, wherein the human machine interface is provided by the display or a separate device or a remote device.

3. The method of claim 1, wherein the human machine interface comprises at least one of
　a touch sensor,
　a gesture sensor,
　a microphone,
　a loud speaker,
　a display device, or
　a vibration generator.

4. The method of claim 1, wherein the human machine interface provides a selection of at least one of the following options:
　starting a correction procedure,
　skipping a correction procedure, finishing a correction procedure,
performing a correction procedure,
shifting each captured image to be manipulated along an x axis,
shifting the faded in orientation line of each captured image to be manipulated along the x axis,
shifting each captured image to be manipulated along any axis, or
shifting the faded in edge line of each captured image to be manipulated along the y axis.

5. The method of claim 1, wherein the human machine interface provides at least one of
a virtual button,
a virtual bar,
a directional beam, or
a coordinate system with x and y axes.

6. The method of claim 1, wherein each faded in orientation line represents at least one of a side edge of the vehicle, a curb or a road line.

7. The method of claim 1, wherein each faded in orientation line is at least one of
determining a vehicle part fixed relative to a driver's cabin of the vehicle, or
determined based on information of at least one of the vehicle contour, a curb, or a road line.

8. The method of claim 1, wherein each faded in orientation line is determined, automatically or on demand, based on at least one of stored data, the pixel flow technology or object detection.

9. The method of claim 1, wherein the manual correction step comprises at least one of
hitting a button displayed on a touch-sensitive display by hand, or
moving a control device by hand.

10. A rearview system configured for execution of the method for correcting stitching problems of claim 1, comprising
two cameras mounted to a camera wing that is configured to be moved between an operating position, in which each camera has a rearview for capturing an image, and a folding position,
a display configured for displaying at least one of the images captured by the two cameras as a composite image,
a position sensor for the camera wing configured for detecting whether or not the camera wing is in its operating position,
a controller configured for controlling the recording direction of at least one of the two cameras, with the controller being operable by hand.

11. The rearview system of claim 10, wherein the controller is operable via at least one of
a touch,
a gesture or
a voice command.

12. A vehicle, comprising the rearview system of claim 10.

* * * * *